April 22, 1947.  H. D. ISENBERG  2,419,217
WEIGHING APPARATUS
Filed March 22, 1945  2 Sheets-Sheet 1

INVENTOR.
HANS D. ISENBERG
BY Mueller, Dodds & Mason
ATTORNEYS

Patented Apr. 22, 1947

2,419,217

UNITED STATES PATENT OFFICE 2,419,217

WEIGHING APPARATUS

Hans D. Isenberg, Wilmette, Ill.

Application March 22, 1945, Serial No. 584,147

15 Claims. (Cl. 265—27)

The present invention relates to weighing apparatus and more particularly to improvements in weighing apparatus of the analytical balance type employing the beam balance principle to provide the desired weight indication.

Balance type weighing devices are widely used in laboratory work in the weighing of small quantities of material having weights ranging from several grams down to small fractions of a milligram. The beam balance principle is utilized in this type of device because of the accuracy obtained. In weighing very small quantities of material, however, the accuracy of this type of device decreases and the difficulties involved in obtaining accurate weight indications increase. Thus, in weighing a mass of very small unknown weight, several minutes may be required on the part of a skilled operator in order to obtain a balance. Below certain weight values, it is almost impossible with conventional balances to obtain accurate weight measurements. Extraneous vibration is another factor affecting the accuracy and useability of such devices. Thus, if a device of this form is subjected to extraneous vibratory forces, it is exceedingly difficult, if not impossible, to obtain an accurate indication of a mass of small unknown weight.

It is an object of the present invention, therefore, to provide improved weighing apparatus which may be easily and rapidly operated to provide accurate weight indications over weight ranges including weights of a low order of magnitude.

It is another object of the invention to provide weighing apparatus of the character described in which the balancing operation is eliminated in determining the weight of a mass.

In acordance with a further object, facilities are provided for preventing extraneous vibratory forces acting upon the apparatus from adversely affecting the accuracy of the apparatus, particularly in the weighing of small masses.

It is still another object of the invention to provide improved weighing apparatus of the character described in which the response of the weight indicating element is linearly related to variations in the weights being measured.

According to a still further object of the invention, exceedingly simple and easily adjustable facilities are provided for changing the range of weights which the apparatus is capable of accurately measuring.

The invention both as to its organization and method of operation, together with further objects and advantages thereof, will best be understood by reference to the following specification taken in connection with the accompanying drawings, in which.

Figure 1:
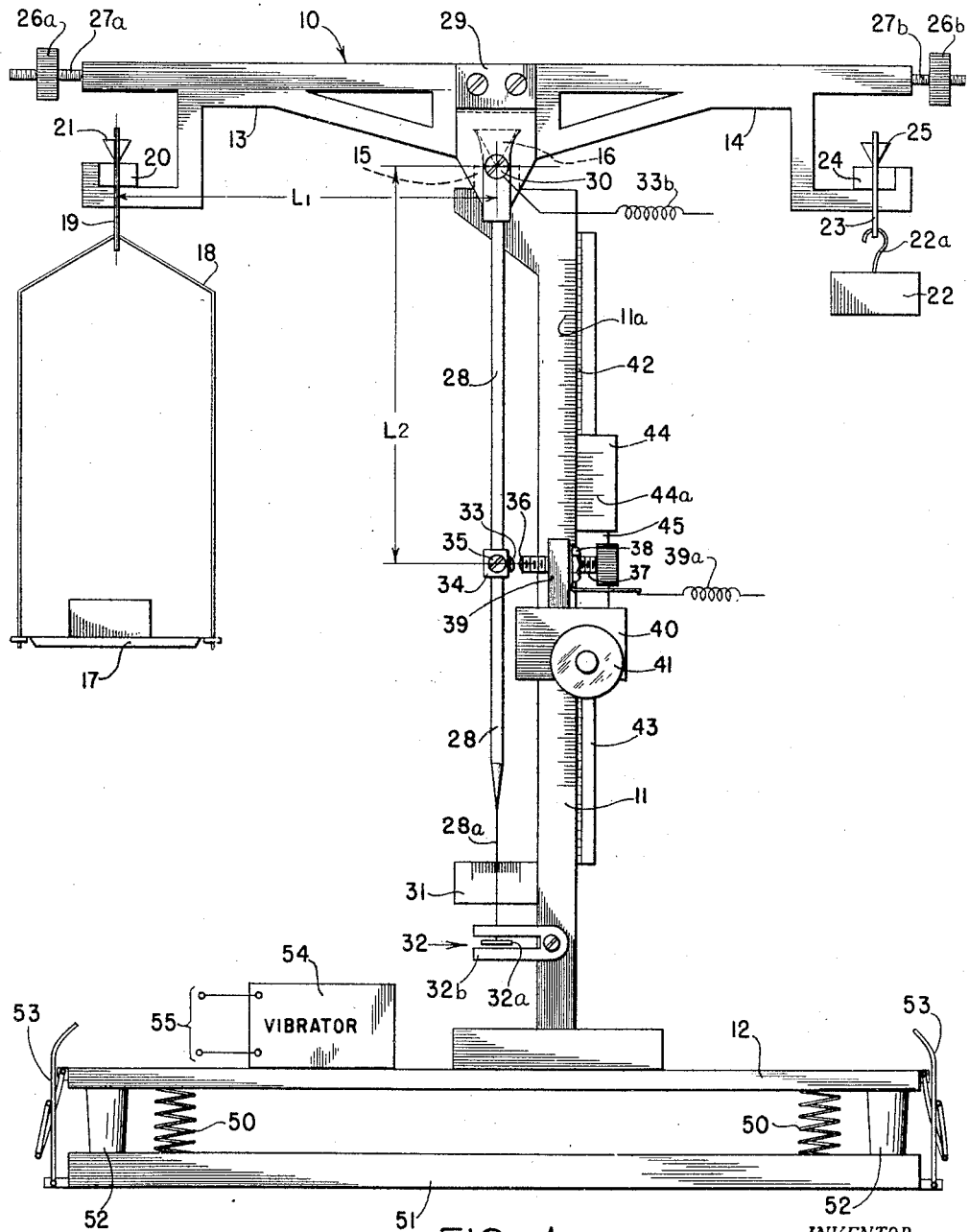
Fig. 1 is a front elevational view of improved weighing apparatus characterized by the features of the present invention.

Referring now to the drawings, and more particularly to Fig. 1 thereof, the present invention is there illustrated in its embodiment in weighing apparatus of the analytical balance type, embodying a weighing beam 10 which is pivotally supported intermediate its ends upon a vertical supporting member 11 by means of the usual jewel bearings 16 and 15. These bearings are respectively mounted upon the beam 10 and the upper end of the vertical supporting member 11. At its lower end this member is fixedly anchored and rigidly supported upon a base 12. The left or weighing arm 13 of the beam 10 is utilized to carry the mass supporting means upon which a mass of unknown weight may be deposited. Specifically, the mass supporting means comprises a tray 17 held at the lower end of a tray holder 18, which in turn is carried by a hook 19 having a jewel bearing 21 pivotally supported upon a jewel bearing 20 which is fixedly mounted upon the beam arm 13 adjacent the left end thereof in the manner illustrated. The opposite or counterbalancing arm 14 of the beam 10 is utilized to support a counterweight 22 having the function of balancing the described mass supporting means before a weighing operation is started. If required, different counterweights 22 may be employed to counterbalance the weights of mass suporting means having different weights. Each counterweight 22 is provided with a hook 22a engageable with a second downwardly depending hook 23 which mounts a jewel bearing 25 engageable with a second jewel bearing 24 fixedly mounted upon the arm 14 adjacent the right end thereof. Small weights 26a and 26b adjustable along screws 27a and 27b, respectively, projecting from the respective ends of the beam 10 are provided for obtaining perfect counterbalancing of the mass supporting means before a weighing operation is started.

For the purpose of indicating a perfect balance of the beam 10 before starting a weighing operation, an indicating arm 28 is mounted for movement with the beam 10 by means of a supporting member 29 which is screw connected to the beam and is rigidly connected to the upper end of the indicating arm. At its lower end, this arm has a thin indicating part 28a arranged to coact with a scale inscribed upon an indicating member 31 suitably mounted upon the supporting member 11, to indicate deflection of the beam 10 from a perfectly balanced position. In this regard it is noted that the lines of bearing engagement between the jewel bearings 21 and 20, the bearings 16 and 15, and the bearings 25 and 24 are in exact alignment, and that the indicating arm 28 extends downward normal to the plane passing through these bearing lines. It is also pointed out that knife edge or line contacts are employed between the respective pairs of engaged bearings in order to reduce friction to a minimum.

The present improved facilities for measuring and indicating the unknown weights of masses carried by the tray 17, comprise a pair of electrically conductive contacts 33 and 36, which are of semi-spherical configuration and have a contact resistance when engaged which is a predetermined function of the magnitude of the contact pressure therebetween. The contact 33 is formed integral with a slide member 34 which is adjustable along the indicating arm 28 and may be fixedly clamped in any desired position along this arm by means of a set screw 35. The stationary contact 36 is formed integral with an adjusting screw 37 which is finely threaded through a supporting piece 39 preferably formed integral with a carrier member 40. A lock nut 38 threaded along the screw 37 is provided to coact with the supporting piece 39 in locking the screw in positions to which it is adjusted. The carrier member 40 is slidably supported upon the vertical supporting member 11 for vertical adjustment along this member by means of a slide member 43, which is mounted upon the support member 11 to the rear thereof. In order to effect such vertical adjustment of the carrier member 40, an adjusting screw 41 is journalled in this member and carries at its inner end a small finely toothed gear which engages a finely toothed rack bar 42 rigidly mounted upon the vertical supporting member 11. Thus, by suitable adjustment of the slide member 34 along the arm 28 and corresponding adjustment of the carrier 40 along the vertical supporting member 11, the distance between the contacts 33 and 36 and the bearing point between the bearing members 15 and 16 may be adjusted as desired to change the relationship between contact pressure produced between the contacts and a given weight carried by the supporting tray 17. In order to indicate this relationship, a nonius member 44 is provided having scale graduations 44a arranged to coact with scale markings 11a spaced vertically along the supporting member 11. The nonius member 44 is mounted upon a part 45 of the carrier member 40 for movement with the carrier member, thereby to provide an indication of the weight-contact pressure relationship which obtains at any given setting of the contacts 33 and 36 along the indicating arm 28.

Figure 2:
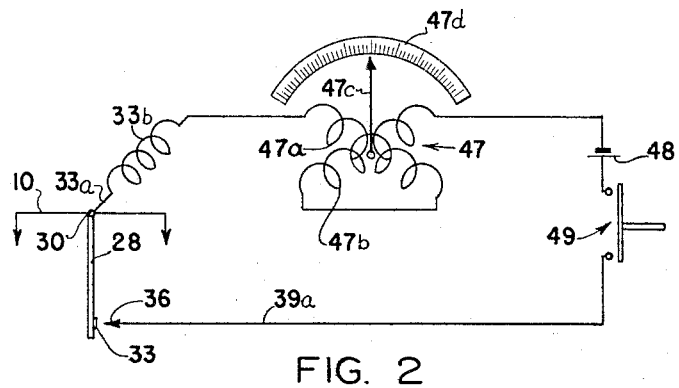
Fig. 2 is a circuit diagram illustrating the circuit arrangement of the electrical components embodied in the apparatus.

The apparatus further comprises electrical means controlled in accordance with the contact resistance of the contacts 33 and 36 for producing an effect, i. e., a visual indication, representative of the unknown weight of a mass carrier by the supporting tray 17. As best shown in Fig. 2 of the drawings, these facilities comprise a voltage source 48, an on-off switch 49 and a galvanometer 47 of the well-known dynamometer type. Specifically, this galvanometer comprises a fixed coil 47b, a movable coil 47a and an indicating element 47c adapted to coact with a suitably calibrated scale 47d to provide an indication of the magnitude of current flow through the series connected coils 47a and 47b. These coils are adapted to be connected in series with the parallel connected contacts 33 and 36 across the terminals of the voltage source 48 through operation of the switch 49, so that the current flow therethrough is a function of the contact resistance between the contacts 33 and 36. At this point it is noted that the circuit conductor 39a interconnecting the contact 36 with the switch 49 is soldered or tightly clamped to the contact screw 37, and the circuit conductor 33a interconnecting the contact 33 with the galvanometer 47 is connected to a terminal screw 30 which is disposed in exact alignment with the contact line between the bearings 15 and 16. The latter conductor is provided with a coiled flexible portion 33b in order to prevent the connection with the member 34 from producing a force affecting the balance of the beam 10 and hence the accuracy of the weight indication produced by the apparatus. Also, tightly clamped connections are provided at the connecting points in the circuit between the conductor 33a and the contact 33, i. e., at the screws 30 and 35, in order to prevent the contact resistance at these points from becoming appreciable as compared with the contact resistance between the contacts 33 and 36.

As will be in part evident from the above description of the apparatus, in order to determine the weight of an unknown mass, the supporting means comprising the tray 17 is first perfectly counterbalanced to produce a zero indication of the arm pointer 28a along the scale 31. This is accomplished through the use of a suitable counterweight 22 and by appropriate adjustment of the balancing weights 26a and 26b along the screws 27a and 27b. After this adjustment is established, and with the movable contacts 33 and 36 appropriately adjusted along the indicating arm 28, the contact screw 37 is adjusted until the contact 36 thereof is just out of contact with the movable contact 33. Following this operation, the mass of unknown weight is deposited upon the supporting tray 17 to produce a counterclockwise deflection of the beam 10 and the arm 28, and thus effect engagement of the contact 33 with the contact 36 with a contact pressure therebetween which is directly related to the unknown weight of the mass. Thus, the contact pressure between the engaged contacts 33 and 36 is determined by the weight of the mass carried by the supporting tray 17, and varies in accordance with changes in the weight of this unknown mass. For each given setting of the contacts 33 and 36 along the indicating arm 28, therefore, a different contact pressure between the engaged contacts is produced in response to changes in the weight imposed upon the supporting tray 17. At each predetermined value of contact pressure, the contacts 33 and 36 have a corresponding contact resistance. Accordingly, by closing the switch 49, a current flow is produced through the windings 47a and 47b which is determined by the unknown weight of the mass carried by the supporting tray 17 and changes in accordance with variations in this weight. By suitable calibration of the scale 47d, therefore, the indicating pointer 47c is caused to coact with this scale to provide a directly readable indication of the weight of the mass carried by the supporting tray 17.

Figure 3:
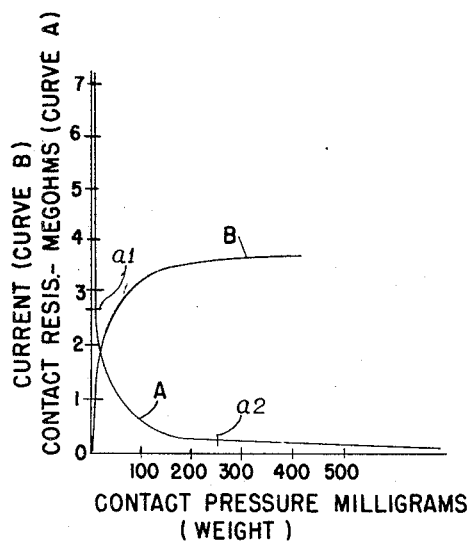
Fig. 3 is a graph illustrating certain characteristics of one of the elements embodied in the apparatus.

More specifically considered, the configuration of the contact resistance-contact pressure characteristic of the semi-spherical contacts 33 and 36 is typified by the curve A shown in Fig. 3 of the drawings. This curve is a quantitatively accurate representation of the contact resistance-contact pressure characteristic for a pair of semi-spherical contacts formed of brass and having sphere diameters of .15625 inch and .32205 inch, respectively. From an inspection of this curve, it will be observed that within the portion a1—a2 of this curve which may be used in translating weight into an effect or indication, the curve is essentially non-linear. Specifically, this portion of the curve follows an inverse square root law and accurately conforms to the expression:

$$R = \frac{C}{\sqrt{P}}$$

where:

R = Contact resistance in ohms.
P = Contact pressure in any unit weight.
C = A constant which is dependent upon the shape of the contacts, the material from which the contacts are made, the voltage applied across the contacts, and the system of weights used in determining P.

In determining the curve A, a direct current voltage source of 1.2 volts was employed. Neglecting the external resistance of the circuit in which the contacts 33 and 36 are serially included, which resistance is very small as compared with the contact resistance of the contacts over the portion a1—a2 of the curve A, the contact current-contact pressure characteristic B of the contacts, and hence of the circuit, is essentially the inverse of the described contact pressure-contact resistance characteristic. In other words, this characteristic curve follows a square root law in that it satisfies the expression:

$$I = \frac{E\sqrt{P}}{C}$$

where:

E = The applied voltage, and
I = Current through the contacts.

It is apparent, therefore, that if an instrument 47 having a linear current-indication response characteristic is used to translate the current in the indicating circuit into an indication of the weight thrusting the contact 33 against the contact 36, non-linear calibration of the instrument scale 47d must be relied upon to compensate for the non-linearity of the curve B.

In accordance with a particular feature of the present invention, a linear relationship between the magnitude of the weight thrusting the contact 33 against the contact 36 and the deflection of the galvanometer 47 is obtained by employing a galvanometer of the dynamometer type described above. This instrument is a square law instrument in that the deflection of the indicating element is a function of the square of the current through the coils thereof. In general, the relationship between these factors is defined by the expression:

$$D = KI^2$$

or $$I = \sqrt{\frac{D}{K}} = \sqrt{\frac{D}{K'}}$$

where:

D = Deflection of the instrument indicating element.
K = Constant of the instrument.
K' = A new constant obtained by removing K from beneath the square root sign.

Relating the contact pressure between the contacts 33 and 36 to deflection of the instrument indicating element 47c relative to the scale 47d, the expression is obtained:

$$\sqrt{P} = \frac{C\sqrt{D}}{EK'}$$

Since C, E and K' are constants, the expression $$\frac{C}{EK'}$$

may be resolved into a single contant K'' which is obtained by squaring the value $$\frac{C}{EK'}$$

and removing the factors P and D from beneath the square root signs. Thus, the relationship between P and D may be expressed $$P = K''D$$

Since P is directly proportional to the weight carried by the supporting tray 17, $$W = K''D$$

Figure 4:
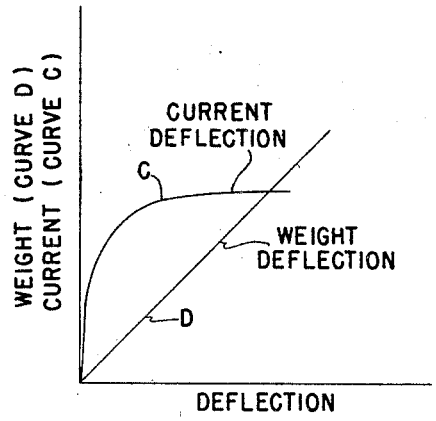
Fig. 4 is a graph illustrating certain characteristics of another element of the apparatus.

It is apparent, therefore, that when an instrument 47 having a square law current-deflection characteristic is employed, the relationship between the weight thrusting the contact 33 against the contact 36 and the resulting deflection of the instrument indicating element 47c becomes substantially linear. Graphically, the current-deflection characteristic of the instrument 47 as shown at C in Fig. 4, should correspond in pattern to the current-pressure characteristic B of the contacts 33 and 36 and hence is the inverse of the contact pressure-contact resistance characteristic A. Under such circumstances, the weight-deflection characteristic of the device as indicated at D in Fig. 4 becomes absolutely linear. Hence a linearly calibrated scale 47d may be provided in the instrument 47 to produce an effect, i. e., an indication, representative of the weight carried by the tray 17.

Since the galvanometer 47 has a fixed deflection range for a given range of variation in the current flow through its coils 47a and 47b, and the range of current change in the circuit including these coils is determined by a given range of variation in the contact resistance between the contacts 33 and 36, it will be understood that for a given setting of these contacts along the indicating arm 28, the apparatus is only capable of measuring weights falling within a given weight range. Preferably, the mid-point of this range should correspond to the center of the region a1—a2 along the contact resistance-contact pressure characteristic A. The weight range which the apparatus is capable of measuring may, however, be shifted within wide limits by appropriate adjustment of the contacts 33 and 36 along the indicating arm 28. Thus the contact pressure which is produced between the contacts 33 and 36 is proportional to the factor:

$$\frac{WL_1}{L_2}$$

where:

W = Unknown weight.
$L_1$ = Distance between the bearing edges of the bearings 16 and 21.
$L_2$ = Distance between the contacts 33 and 36 and the bearing edge of the bearing 16.

Thus, it will be evident that by increasing or decreasing the distance $L_2$ the weight-contact pressure relationship is correspondingly changed. In order to indicate this relationship the nonius member 44 is moved with the carrier member 40 during vertical adjustment of the contacts 33 and 36 along the vertical support 11. The scale 44a inscribed upon the nonius member coacts with the scale 11a to indicate a factor, i. e., a constant, which, when multiplied by a given indication of the galvanometer 47, provides an accurate indication of the weight of the mass carried by the supporting tray 17. It will thus be apparent that by providing adjustability of the contacts 33 and 36 along the indicating arm 28, the effective weighing range of the apparatus is materially increased.

One of the problems involved in maintaining the accuracy of the apparatus when it is used to measure exceedingly small weights is that of preventing extraneous vibration of the base 12 from changing the contact resistance of the contacts 33 and 36 within such wide limits as to preclude an accurate weighing of the mass carried by the tray 17. When such extraneous vibration is of a low order of magnitude and the weights to be measured are of a substantial order of magnitude, extraneous vibration may be rendered of no importance through the action of a magnetic damping assembly 32. This assembly comprises a permanent or electromagnet 32b mounted upon the vertical supporting member 11 and having an air gap for receiving a non-magnetic but conductive armature 32a which is mounted for movement with the lower end of the indicating arm 28. This assembly functions in a conventional manner to minimize rapid relative movement between the arm 28 and the vertical supporting member 11, and hence rapid changes in the contact pressure between the contacts 33 and 36 which might otherwise occur when extraneous vibratory forces are applied to the base 12.

In order to obviate the effects of extraneous vibration when the vibratory forces are of substantial amplitude and the weights to be measured are of exceedingly small value, thereby to obtain an indication on the measuring instrument which is substantially independent of the extraneous vibratory forces acting upon the apparatus, the supporting base 12 may be spring mounted by means of springs 50 upon a sub-base 51 to which the vibratory forces are applied. Further to this end, an electro-mechanical vibrator 54, which is adapted for energization from a suitable current source indicated by the bracketed terminals 55, is provided to oscillate the contact 36 at a predetermined rate in the direction along which the contacts 33 and 36 are engaged. For convenience in using the apparatus, the base 12 may be provided with supporting feet 52 which are normally held in bearing engagement with the sub-base 51 by means of releasable toggle type clips 53 to provide a rigid support for the base 12 and the parts mounted thereon. With this arrangement and by suitable manipulation of the clips 53, the springs 50 may be rendered effective to elevate the base 12 until the feet are disengaged from the sub-base 51, whereby the base 12 and the parts carried thereby are resiliently supported solely by the springs. For maximum effectiveness in rendering the response of the apparatus independent of extraneous vibratory forces, the springs 50 should each have a very low spring constant, and the vibratory force produced by the vibrator 54 should have a frequency and amplitude substantially greater than the highest frequency and largest amplitude of any extraneous vibratory force acting upon the sub-base 51. Preferably the vibrator 54 has a vibrating frequency of the order of 200 cycles per minute. Further, the natural resonant frequency of the moving system comprising the base 12 and the parts carried thereby should be substantially different from the frequencies of any extraneous vibratory forces acting upon the sub-base 51. For reasons pointed out more fully below, when the vibrator 54 is active, it is preferable to use in the indicating circuit an indicating instrument, such, for example, as a d'Arsonval galvanometer, having a linear current-deflection characteristic.

As will be apparent from the preceding explanation, with the springs 50 supporting the base 12 and the vibrator 54 in operation, vibratory forces are transmitted through the base 12 and the vertical supporting member 11 which serve periodically to vary the contact pressure between the contacts 33 and 36 at the predetermined rate of vibration of the vibrator. Such forced vibration of the base 12 and the springs 50 minimizes the effects of the spurious vibratory forces acting upon the sub-base 51. Thus, the contact pressure produced by the weight of the mass carried by the tray 17 is periodically varied about a mean value representative of this weight, through the action of the vibratory force transmitted to the contact 36 by the vibrator 54. The contact pressure between the contacts 33 and 36 and hence the contact resistance therebetween is, therefore, rendered substantially independent of the extraneous vibratory forces. Further, since this contact pressure is varied, through the action of the vibrator 54, about a mean value which is accurately representative of the weight under observation, the contact resistance between the contacts 33 and 36 is correspondingly varied about a mean value which is determined by the weight under observation and is substantially independent of the extraneous vibratory forces. As a result, a direct current having a pulsating component is caused to flow in the circuit including the moving coil of the galvanometer 47. As is characteristic of such devices, the galvanometer 47 is essentially an integrating instrument, such that the indicating element assumes a position accurately representative of the mean value of the current traversing its moving coil. Thus, the indicating element of the instrument assumes a setting which is accurately indicative of the weight of the mass carried by the tray 17. Suitable graduation of the instrument scale may be employed to provide for direct reading of this weight. The reason for providing an instrument 47 having a linear current-deflection characteristic now becomes apparent. Thus, if an instrument having a square law current-deflection characteristic is employed, the indicating element of the instrument tends to assume a setting representative of the root mean square value of current traversing the coil of the instrument, rather than a setting representative of the mean value of current flow therethrough. Thus, an inaccurate weight indication would be produced by the indicating element of such an instrument, in the absence of peculiar calibration. By providing an instrument 47 having the described linear current-deflection characteristic, however, this problem is obviated.

While there has been described what is at present considered to be the preferred embodiment of the invention, it will be understood that various modifications may be made therein which are within the true spirit and scope of the invention as defined in the appended claims.

I claim:

1. Weighing apparatus comprising mass supporting means, a pair of electrically conductive contacts having a contact resistance when engaged which is a predetermined function of the magnitude of the contact pressure therebetween, means for producing a contact pressure between said contacts which is related to the weight of a mass carried by said supporting means, and electrical means controlled in accordance with the contact resistance of said contacts for producing an effect representative of the weight of the mass carried by said supporting means.

2. Weighing apparatus comprising mass supporting means, a pair of electrically conductive contacts having a contact resistance when engaged which is a predetermined function of the magnitude of the contact pressure therebetween, means for producing a contact pressure between said contacts which is related to the weight of a mass carried by said supporting means, means for passing a current through said contacts which varies in accordance with variations in the contact resistance therebetween, and means energized by said current for producing an effect representative of the weight of the mass carried by said supporting means.

3. Weighing apparatus comprising mass supporting means, a pair of electrically conductive contacts having a predetermined non-linear contact pressure-contact resistance characteristic when engaged, means for producing a contact pressure between said contacts which is related to the weight of a mass carried by said supporting means, a current responsive device for indicating the weight of the mass carried by said supporting means and having a deflection current characteristic which is substantially the inverse of said contact pressure-contact resistance characteristic, and means for passing a current through said device which varies in accordance with variations in the contact resistance between said contacts, thereby to produce an indication by said device which is representative of the weight of the mass carried by said supporting means.

4. Weighing apparatus comprising mass supporting means, a pair of electrically conductive contacts having an inverse square root law contact pressure-contact resistance characteristic when engaged, means for producing a contact pressure between said contacts which is related to the weight of a mass carried by said supporting means, current responsive means for producing an indication of the weight of the mass carried by said supporting means, and means for passing a current through said current responsive means which varies in accordance with variations in the contact resistance between said contacts, thereby to produce an indication by said device which is representative of the weight of the mass carried by said supporting means, said current responsive means having a square law deflection current characteristic which is substantially the inverse of said contact pressure-contact resistance characteristic, whereby the response of said current responsive means varies substantially linearly with variations in the weight of the mass carried by said supporting means.

5. Weighing apparatus comprising mass supporting means, a pair of electrically conductive contacts having a contact resistance when engaged which is a predetermined function of the magnitude of the contact pressure therebetween, means for translating the weight of a mass carried by said supporting means into a contact pressure between said contacts which is related to the weight of the mass carried by said supporting means, electrical means controlled in accordance with the contact resistance of said contacts for producing an effect representative of the weight of the mass carried by said supporting means, and adjustable means for changing the translating relationship between the weight of a given mass carried by said supporting means and the contact pressure between said contacts.

6. Weighing apparatus comprising mass supporting means, a pair of electrically conductive contacts having a contact resistance when engaged which is a predetermined function of the magnitude of the contact pressure therebetween, force transmitting means interconnecting said supporting means and one of said contacts to produce a contact pressure between said contacts which bears a predetermined relationship to the weight of a mass carried by said supporting means, electrical means controlled in accordance with the contact resistance of said contacts for producing an effect representative of said weight, and adjustable means for changing the relationship between the weight of a given mass carried by said supporting means and the contact pressure produced between said contacts.

7. Weighing apparatus comprising mass supporting means, a pair of electrically conductive contacts having a contact resistance when engaged which is a predetermined function of the magnitude of the contact pressure therebetween, force transmitting means interconnecting said supporting means and one of said contacts to produce a contact pressure between said contacts which bears a predetermined relationship to the weight of a mass carried by said supporting means, electrical means controlled in accordance with the contact resistance of said contacts for producing an effect representative of said pressure, adjustable means for changing the relationship between the weight of a given mass carried by said supporting means and the contact pressure produced between said contacts, and means at least in part controlled by said last-named means for indicating the relationship between the weight of the mass carried by said supporting means and the contact pressure between said contacts.

8. Weighing apparatus comprising mass supporting means, a pair of electrically conductive contacts having a contact resistance when engaged which is a predetermined function of the magnitude of the contact pressure therebetween, means for producing a contact pressure between said contacts which is related to the weight of a mass carried by said supporting means, electrical means controlled in accordance with the contact resistance of said contacts for producing an effect representative of the weight of the mass carried by said supporting means, and means for preventing extraneous vibratory forces acting upon said apparatus from substantially affecting the response of said last-named means.

9. Weighing apparatus for accurately producing weight indications while being acted upon by extraneous vibratory forces, comprising mass supporting means, a pair of electrically conductive contacts subject to said extraneous vibratory forces and having a contact resistance when engaged which is a predetermined function of the magnitude of the contact pressure therebetween, means for producing a contact pressure between said contacts which is related to the weight of a mass carried by said supporting means, means for producing a variable current flow through said contacts having a mean value which is determined by said contact resistance and is substantially independent of said vibratory forces, and electrical means controlled in accordance with the mean value of said current for producing an indication representative of the weight of the mass carried by said supporting means.

10. In weighing apparatus of the counterbalanced beam type including an indicating arm movable with the weighing beam, a movable contact carried by said arm for movement therewith, a stationary contact engageable by said movable contact to produce a predetermined contact pressure therebetween when said beam is unbalanced by a mass of unknown weight, said contacts having a contact resistance when engaged which is a predetermined function of the magnitude of the contact pressure therebetween, means for passing a current through said contacts which varies in accordance with variations in the contact resistance thereof, and indicating means energized by said current for producing an indication representative of the unknown weight of said mass.

11. In weighing apparatus of the counterbalanced beam type including an indicating arm movable with the weighing beam, a movable contact carried by said arm for movement therewith, a stationary contact engageable by said movable contact to produce a predetermined contact pressure therebetween when said beam is unbalanced by a mass unknown weight, said contacts having a contact resistance when engaged which is a predetermined function of the magnitude of the contact pressure therebetween, means for passing a current through said contacts which varies in accordance with variations in the contact resistance thereof, indicating means energized by said current for producing an indication representative of the unknown weight of said mass, and means for adjustably changing the position of said contacts along said arm, thereby to change the unbalancing weight-contact pressure relationship and thus provide for a change in the unknown weight range represented by the indicating range of said indicating means.

12. In weighing apparatus of the counterbalanced beam type including an indicating arm movable with the weighing beam, a movable contact carried by said arm for movement therewith, a stationary contact engageable by said movable contact to produce a predetermined contact pressure therebetween when said beam is unbalanced by a mass of unknown weight, said contacts having a contact resistance when engaged which is a predetermined function of the magnitude of the contact pressure therebetween, means for passing a current through said contacts which varies in accordance with variations in the contact resistance thereof, indicating means energized by said current for producing an indication representative of the unknown weight of said mass, means for adjustably changing the position of said contacts along said arm, thereby to change the unbalancing weight-contact pressure relationship and thus provide for a change in the unknown weight range represented by the indicating range of said indicating means, and means including an indicating element movable with said stationary contact for indicating said unbalancing weight-contact pressure relationship.

13. In weighing apparatus of the counterbalanced beam type for accurately producing weight indications while being acted upon by extraneous vibratory forces and including an indicating arm movable with the weighing beam, a movable contact carried by said arm for movement therewith, a stationary contact engageable by said movable contact to produce a predetermined contact pressure therebetween when said beam is unbalanced by a mass of unknown weight, said contacts having a contact resistance when engaged which is a predetermined function of the magnitude of the contact pressure therebetween, means for producing a variable current flow through said contacts having a mean value which is determined by said contact resistance and is substantially independent of said vibratory forces, and electrical indicating means controlled in accordance with the mean value of said current for producing an indication representative of the unknown weight of said mass.

14. In weighing apparatus of the counterbalanced beam type for accurately producing weight indications while being acted upon by extraneous vibratory forces and including an indicating arm movable with the weighing beam, a movable contact carried by said arm for movement therewith, a stationary contact engageable by said movable contact to produce a predetermined contact pressure therebetween when said beam is unbalanced by a mass of unknown weight, said contacts having a contact resistance when engaged which is a predetermined function of the magnitude of the contact pressure therebetween, means for producing a variable current flow through said contacts having a mean value which is determined by said contact resistance and is substantially independent of said vibratory forces, electrical indicating means controlled in accordance with the mean value of said current for producing an indication representative of the unknown weight of said mass, and means for adjustably changing the position of said contacts along said arm, thereby to change the unbalancing weight-contact pressure relationship and thus provide for a change in the unknown weight range represented by the indicating range of said indicating means.

15. In weighing apparatus of the counterbalanced beam type for accurately producing weight indications while being acted upon by extraneous vibratory forces and including an indicating arm movable with the weighing beam, a movable contact carried by said arm for movement therewith, a stationary contact engageable by said movable contact to produce a predetermined contact pressure therebetween when said beam is unbalanced by a mass of unknown weight, said contacts having a contact resistance when engaged which is a predetermined function of the magnitude of the contact pressure therebetween, means for producing a variable current flow through said contacts having a mean value which is determined by said contact resistance and is substantially independent of said vibratory forces, electrical indicating means controlled in accordance with the mean value of said current for producing an indication representative of the unknown weight of said mass, means for adjustably changing the position of said contacts along said arm, thereby to change the unbalancing weight-contact pressure relationship and thus provide for a change in the unknown weight range represented by the indicating range of said indicating means, and means including an indicating element movable with said stationary contact for indicating said unbalancing weight-contact pressure relationship.

HANS D. ISENBERG.

REFERENCES CITED

The following references are of record in the file of this patent:

UNITED STATES PATENTS

| Number | Name | Date |
| --- | --- | --- |
| 1,814,465 | Becq | July 14, 1931 |
| 1,681,314 | Vawter | Aug. 21, 1928 |
| 1,826,024 | Roller | Oct. 6, 1931 |

FOREIGN PATENTS

| Number | Country | Date |
| --- | --- | --- |
| 315,392 | British | Aug. 25, 1930 |
| 457,295 | British | Nov. 25, 1936 |